United States Patent [19]

Oh

[11] Patent Number: 5,610,498
[45] Date of Patent: Mar. 11, 1997

[54] CIRCUIT AND METHOD FOR CONTROLLING CHARGING OF A BATTERY

[75] Inventor: Byung K. Oh, Seoul, Rep. of Korea

[73] Assignee: Goldstar Co., Ltd., Seoul, Rep. of Korea

[21] Appl. No.: 350,672

[22] Filed: Dec. 7, 1994

[30] Foreign Application Priority Data

Dec. 8, 1993 [KR] Rep. of Korea ............... 26924/1993

[51] Int. Cl.⁶ .................. H01M 10/44; H01M 10/46; H01M 10/48
[52] U.S. Cl. ......................... 320/39; 320/48
[58] Field of Search ................. 320/5, 30, 39, 320/13, 40, 48

[56] References Cited

U.S. PATENT DOCUMENTS 5,352,970  10/1994  Armstrong, II ............... 320/39

FOREIGN PATENT DOCUMENTS 0460888  6/1992  European Pat. Off. .
0588727  3/1994  European Pat. Off. .

*Primary Examiner*—Edward H. Tso
*Attorney, Agent, or Firm*—Fliesler, Dubb, Meyer & Lovejoy

[57] ABSTRACT

A circuit for controlling the charging of a battery and a method thereof, which are capable of discriminating residual voltage and charged voltage of a respective battery and an adapter by means of a central processing unit. Such circuit for controlling the charging of a battery requires less hardware compared to conventional circuitry, so that the net cost for the product is reduced and power is conserved. Also malfunctions thereof are advantageously prevented, thereby enhancing product reliability.

7 Claims, 3 Drawing Sheets

CIRCUIT AND METHOD FOR CONTROLLING CHARGING OF A BATTERY

BACKGROUND OF THE INVENTION

1. Field of the Invention

The present invention relates to a battery charge control apparatus and a method thereof, and in particular to a battery charge control apparatus and a method thereof, which are capable of recognizing whether or not a battery and/or an adapter are sufficiently discharged using computer software and a central processing unit which is disposed therein.

2. Description of the Conventional Art

Conventionally, a battery charge apparatus is directed to be automatically charged in a state when an electronic instrument is connected to an adapter. Unlike a Ni-cd battery, a Li-ion battery is light and is not equipped with a power memory function, so that it is available anytime when it is needed for use.

Referring to FIG. 1, there is shown a circuit showing a conventional battery charge apparatus. As shown therein, it includes a ground connection control circuit 1 having transistors Q1 and Q2 and MOS(Metal Oxide Semiconductor) transistors Tr1 and Tr2 for controlling a connection of an adapter ground terminal AGND and a battery ground terminal BGND in response to battery/adapter mode signals BATT/EXT, a central processing unit 2 for recognizing a voltage of a ground terminal BGND according to a connection of the adapter ground terminal AGND and the battery ground terminal BGND of the ground connection control circuit 1 and for controlling a charge thereof, a power supply circuit 3 consisting of transistors Q8 to Q12 and resistances R17, R19 and R20 for supplying electric power outputted from the central processing unit 2, a battery charge circuit 4 consisting of a first and second amplifiers OP1 and OP2, transistors Q5 to Q7, diodes D1 to D3, condensers C1 and C2 and resistances R3 to R16 in order to charge electric power of the adapter to the battery 6 in response to charge control signals outputted from the central processing unit 2, and a voltage output circuit 5 consisting of transistors Q13 to Q16 and resistances R18, R21 to R23 in order to output a high electric potential outputted from the battery ground BGND and the central processing unit 2.

To begin with, when direct current of the adapter is applied to the camcorder, the battery/adapter signals BATT/EXT of low electric potential is inputted into the base of the transistor Q1. Therefore, the transistor Q1 is turned off and the transistor Q2 which receives the high electric potential in response to the transistor Q1 is turned off, so that an electric potential difference occurs between the battery ground terminal BGND and the adapter ground terminal AGND. According to the electric potential difference therebetween, the voltage Vad of the battery ground terminal BGND is inputted into the charge reference terminal P1 of the central processing unit 2.

Here, the central processing unit 2 recognizes an adapter mode when the voltage Vad of the battery ground terminal BGND is below 4 V and recognizes a battery mode when the voltage Vad thereof is between 4.5 and 5 V.

Thereafter, the central processing unit which receives the voltage below 4 V receives the adapter mode and applies the low electric potential to the base of the transistor Q11 of the power supplying circuit 3 and the base of the transistor Q7 of the charge circuit 4. The transistor Q11 which receives the low electric potential is turned off and applies the high electric potential to the base of the transistor Q11 and the transistor Q10 which receives the high voltage is turned on thereafter.

As the transistor Q10 is turned on, the transistor Q9 which receives the low electric potential is turned off and the high electric potential is applied to the base of the transistor Q8. In addition, as the transistor Q8 which receives the high electric potential is turned off, the voltage of 5 V outputted from the central processing voltage 2 is not applied to the power terminal of the first and second amplifiers OP1 and OP2.

When the charge signals outputted from the charge terminal P2 of the central processing unit 2 is a high electric potential, the transistor Q11 which receives the high electric potential is turned on and thereafter the transistor Q10 which receives the low electric potential is turned off.

As the transistor Q10 is turned off, the transistor Q9 which receives the high electric potential is turned on and the transistor Q8 which receives the low electric potential is turned off.

As the transistor Q10 is turned off, the transistor Q9 which receives the high electric potential is turned on and the transistor Q8 which receives the low electric potential is turned on. As the transistor Q8 is turned on, the power outputted to the power terminal P3 of the central processing unit 2 is respectively applied to the first and second amplifiers OP1 and OP2 through the transistor Q8. The transistor Q8 is controlled by the output signals of the first amplifier OP1 when the first and second amplifiers OP1 and OP2 are normally operated.

As the power is applied to the first and second amplifiers OP1 and OP2 through the transistor Q8, the voltage Vbat applied to the non-inversion terminal(+) of the first amplifier OP1 of the battery charge circuit 4 is defined as the following formula when the resistances R10 and R11 are respectively 22 kΩ and 100 kΩ.

$$Vbat = 22/(22+100) * Vbgnd = 0.181 * Vbgand$$

In addition, the reference voltage Vref1 of the non-inversion(−) is defined as the following formula when the resistances R13 and R14 are respectively 47 kΩ and 1 kΩ.

$$Vref1 = 1/(1+47) * 5 = 0.1\ V$$

In addition, the second amplifier OP2 of the battery charge circuit 4 is defined as the following formula when the resistances R15 and R16 are respectively 1.8 kΩ and 47 kΩ.

$$Vref2 = 1.8/(1.8+47) * 5 = 0.184\ V$$

Thereafter, in case of the adapter mode, as the voltage Vbgnd of the battery ground BGND is higher than the reference voltage Vref1, the condition of Vbat≧Vref1 is resulted thereby and thereafter the output Vo1 of the first amplifier OP1 becomes a high electric potential and the high electric potential is applied to the base of the transistor Q12 of the power supply circuit 3. Meanwhile, as the condition of Vbatt<Vref2 is defined, the output Vo2 of the second amplifier OP2 becomes the high electric potential and the high electric potential is applied to the emitter of the transistor Q7 of the battery charge circuit 4.

As the transistor Q12 of the power supply circuit 3 which receives the high electric potential is turned on and as the low electric potential is applied to the base of the transistor Q8, the transistor Q8 is turned on, so that the high electric potential 5 V outputted from the central processing unit 2 is applied to the base of the transistor Q14 of the voltage output circuit 4 through the transistor Q8.

Thereafter, as the transistor Q14 of the voltage output circuit 4 which receives the high electric potential is turned on and then the low electric potential is applied to the base of the transistor Q15. As the transistor Q15 which receives the low electric potential is turned off, the transistor Q16 which receives the high electric potential is turned off. As the transistor Q16 is turned off, the voltage of the battery ground terminal BGND is applied to the resistance R18. Thereafter, the high electric potential 5 V of the central processing unit 2 is applied to the base of the transistor Q13 and then the transistor Q13 is turned off. Thereafter, as the transistor Q13 is turned off, the voltage Vad of the battery ground terminal BGND which is below 4 V is applied to the charge reference terminal P1 of the central processing unit 2 through the resistance R12.

The central processing unit 2 which detects the voltage Vad recognizes the adapter mode and applies the low electric potential charge signals to the base of the transistor Q7 of the battery charge circuit 4. Thereafter, as the transistor Q7 which receives the low electric potential charge signals is turned on, the transistor Q6 which receives the high electric potential output Vo2 of the second amplifier OP2 through the transistor Q7 is turned on. As the transistor Q6 is turned on, the transistor Q5 which receives the high electric potential output of the first amplifier OP1 through the transistor Q6 is turned on, thereby the battery charge operation is enabled.

Here, the charge conditions for the circuit is as follows. To begin with, the battery voltage of anode(+) is smaller than 9.1 V of the diode D1. That is, the condition of Vbatt(+)<Vd1 is resulted. The voltage of the battery ground BGND is greater than 0.1 V and less than 5.2 V. Here, the charge signals of the central processing unit should be a low electric potential and the output Vo1 of the amplifier OP1 should be a high electric potential.

When the direct current is not applied to the camcorder, that is, in case of the battery mode, the battery/adapter mode signals BATT/EXT of the high electric potential is inputted into the base of the transistor Q1 of the ground connection control circuit 1.

As the transistor Q1 which receives the high electric potential is turned on and as the transistor Q2 which receives the low electric potential is turned on, the transistors TR1 and TR2 which receives the high electric potential are respectively turned on, so that the battery ground terminal BGND is connected to the adapter ground terminal AGND.

Thereafter, since the voltage Vbat by the divided voltage of the resistances R10 and R11 applied to the non-inversion terminal(+) of the first amplifier OP1 of the battery charge circuit 4 is less than the reference voltage Vref1, the low electric potential output Vo1 of the first amplifier OP1 is applied to the base of the transistor Q2 of the power supply circuit 3.

As the transistor Q12 of the power supply circuit 3 which receives the low electric potential output Vo1 of the first amplifier OP1 is turned off, the high electric potential. 5 V outputted through the power terminal P3 of the central processing unit 2 is applied to the base of the transistor Q8 of the power supply circuit 3 through the resistance R20 of the power output circuit 4. Thereafter, the transistor Q8 which receives the high electric potential is turned off, so that an high electric potential outputted from the central processing unit 2 is cut off and then the low electric potential is applied to the base of the transistor Q14 of the power output circuit 4. As the transistor Q14 is turned off, the transistor Q15 which receives the high electric potential is turned on. As the low electric potential is applied to the base of the transistor Q16 of the power output circuit 4, the transistor Q16 is turned on.

Thereafter, when the high electric potential 5V outputted from the power terminal P3 is applied to the charge reference terminal P1 of the central processing unit 2, the central processing unit 2 recognizes the applied 5 V as the battery mode.

In addition, as the transistor Q8 of the power supply circuit 3 is turned on, the reference voltage Vref2 is less than or equal to the voltage Vbatt applied to the inversion terminal(−) of the second amplifier OP2, so that the charge circuit is not enabled due to the low electric potential of the output Vo2 of the second amplifier OP2.

Here, the adapter voltage ACV is over 9.2 V and the voltage Vbgnd of the battery ground BGND is over 5.2 V.

However, the conventional battery charge control apparatus and a method thereof have disadvantages in checking the residue voltage inputted into the analog/digital converter in the central processing unit unless the battery/adapter mode signal is applied to the central processing unit selecting the battery and the external power, so that the central processing unit should continuously check the residue voltage which is inputted, and thus the voltage consumption increase and the camcorder is subject to heat and thus malfunctions may occur. In addition, in order to secure a Li-ion battery in the adapter charge circuit, the manufacturing error occurs thereby and more space is needed therein due to the increased parts thereof.

SUMMARY OF THE INVENTION

Accordingly, it is an object of the present invention to provide a battery charge control apparatus and a method thereof.

To achieve the object, it includes an adapter connection circuit for connecting an adapter and other instruments; a first voltage output circuit for outputting voltages of a battery or the adapter to a predetermined voltage level; a ground connection control circuit for controlling a connection of a battery ground terminal and an adapter ground terminal according to the connection of the adapter at the adapter connection circuit; a battery ground voltage circuit, which is switched in response to charge control signals, for outputting output voltages of the battery or the adapter and for outputting battery ground voltage; a second voltage output circuit for outputting output voltage of the battery ground voltage output circuit to a predetermined voltage level; and a central processing unit for controlling a charge operation of the battery in response to the battery/adapter mode signals of the ground connection control circuit and the output voltage of the first and second voltage output circuit.

It further includes a first step which outputs a charge control signal of a low electric potential when a battery/adapter mode signal is a high electric potential, detects a residue voltage, and displays the residue voltage; a second step which judges whether or not the camcorder operation mode is terminated when the battery/adapter mode signal is a low electric potential, outputs charge control signals of a low electric potential when the result is no, and judges whether or not the adapter voltage is over a predetermined level; a third step which outputs charge control signals of the low electric potential when the adapter voltage is over a predetermined level and judges whether or not the battery ground voltage is between 0.1 V and 5.2 V; a fourth step which outputs charge control signals of the low electric potential when the battery ground voltage is not therebetween and judges whether or not the battery charge voltage is over a predetermined level when the battery ground voltage is therebetween; and a fifth step which outputs charge control signals of the low electric potential when the battery charge voltage is over a predetermined level in the fourth step and outputs charges control signals of the high electric potential and returns to the initial state when the battery charge voltage is not over a predetermined level.

DETAILED DESCRIPTION OF THE PREFERRED EMBODIMENTS

Figure 1:
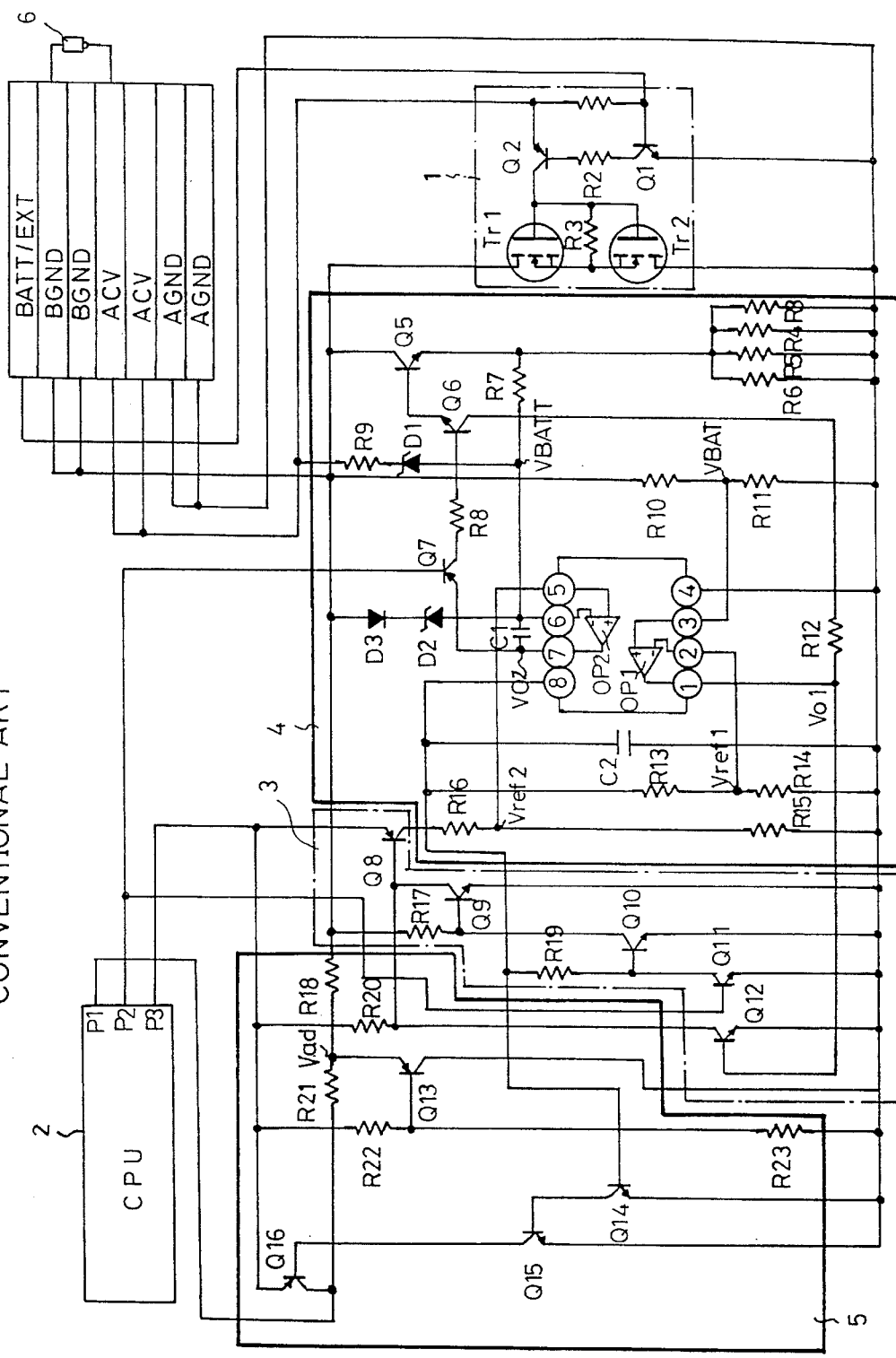
FIG. 1 is a circuit diagram showing a conventional battery charge control apparatus.
Figure 2:
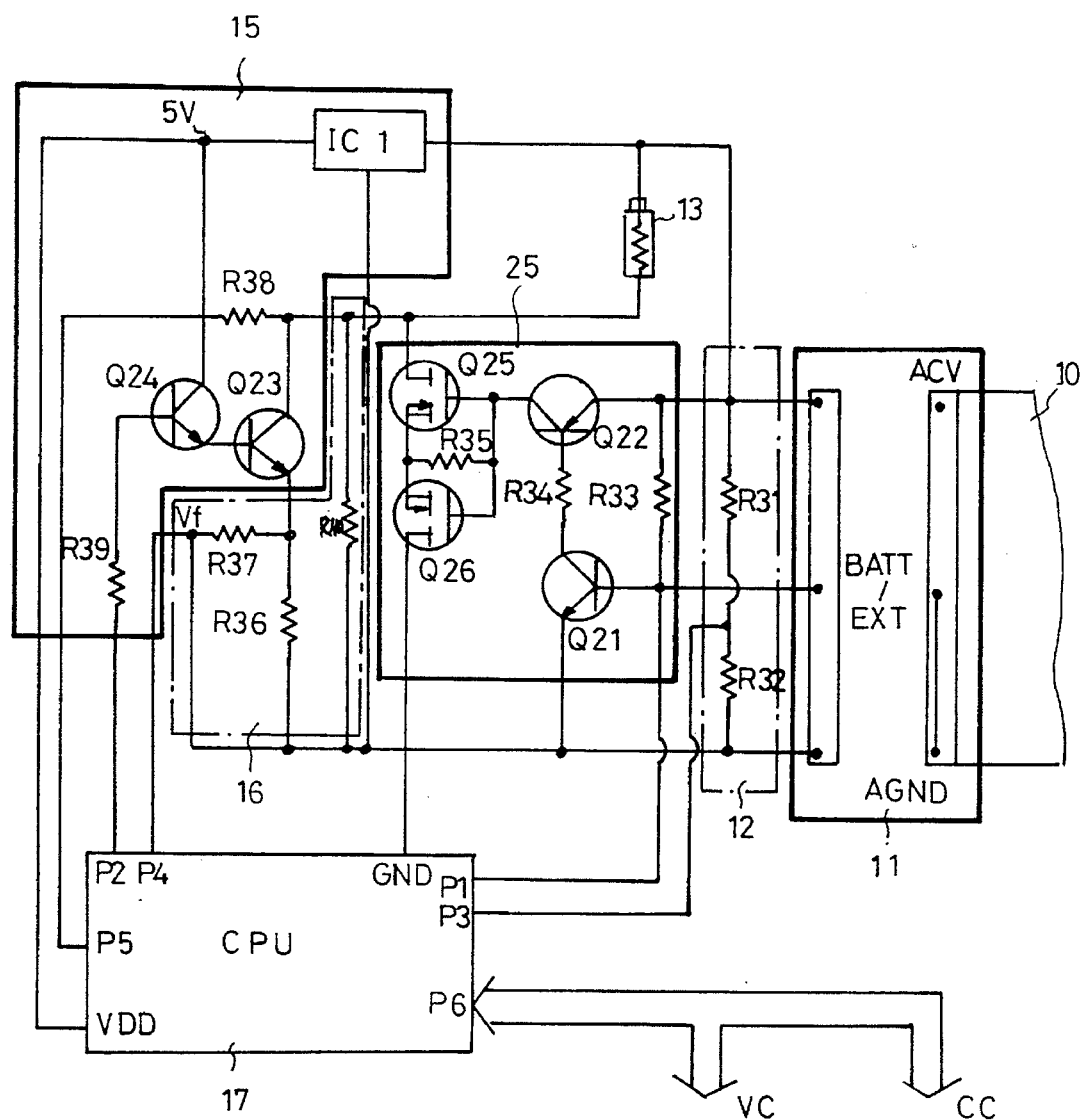
FIG. 2 is a circuit diagram showing a battery charge control apparatus according to the present invention.

Referring to FIG. 2, the present invention includes an adapter connection circuit 11 for connecting an adapter 10 and a camcorder, a first voltage output circuit 12 for outputting a predetermined voltage in response to an output of the adapter connection circuit 11, a ground connection control circuit 14, which is switched in response to the output of the adapter connection circuit 11, for controlling the connection of the ground terminals of the battery 13 and the adapter 10, a battery ground voltage output circuit 15, which is switched in response to the charge signals, for convening the output voltage of the battery 13 to a predetermined voltage and for outputting the ground voltage of the battery 13, a second voltage output circuit 16 for outputting a predetermined voltage in response to an output of the battery ground voltage output circuit 15, and a central processing unit 17 for controlling charge in response to an output of the ground connection control circuit 14, a first and second voltage output circuits 12 and 16 and the battery ground voltage output circuit 15.

The adapter connection circuit 11 is directed to ground the mode terminal of the adapter side so that the battery/adapter mode signals BATT/EXT of the low electric potential of the ground connection control circuit 14 when connecting the adapter.

The first voltage output circuit 12 is directed to divide the power ACV of the battery 13 to the resistances R31 and R32 and to output it to the central processing apparatus 17.

The ground connection control circuit 14 includes a transistor Q21 which is switched in response to the battery/adapter mode signals BATT/EXT, a transistor Q22 for outputting the voltage ACV of the battery 13 or the adapter 10 in response to a switching of the transistor Q21, and MOS transistors Q25 and Q26, which are switched in response to the output voltage of the transistor Q22, for controlling the connection of the battery ground terminal and the adapter ground terminal.

The battery ground voltage output circuit 15 includes a constant-voltage integrated circuit IC1 for outputting a predetermined constant voltage by receiving the voltage of the adapter 10 or the battery 13, a transistor Q24 for outputting a constant voltage of the constant voltage integrated circuit IC1 in response to the charge control signals of the central processing unit 17, and a transistor Q23, which is switched in response to the output of the transistor Q24, for outputting the ground voltage of the battery 13.

The second voltage output circuit 16 is directed to connect one side of the terminal of the resistances R36 and R37 to the emitter of the transistor Q23 of the battery ground voltage output circuit 15, connect the other side of the resistance R36 to the adapter ground terminal, and connect the other side of the resistance R37 to the charge voltage detection terminal P4 of the central processing unit. In addition, the second voltage output circuit 16 includes a resistance R40 for connecting the ground terminal of the battery 13 and the ground terminal of the adapter.

Figure 3:
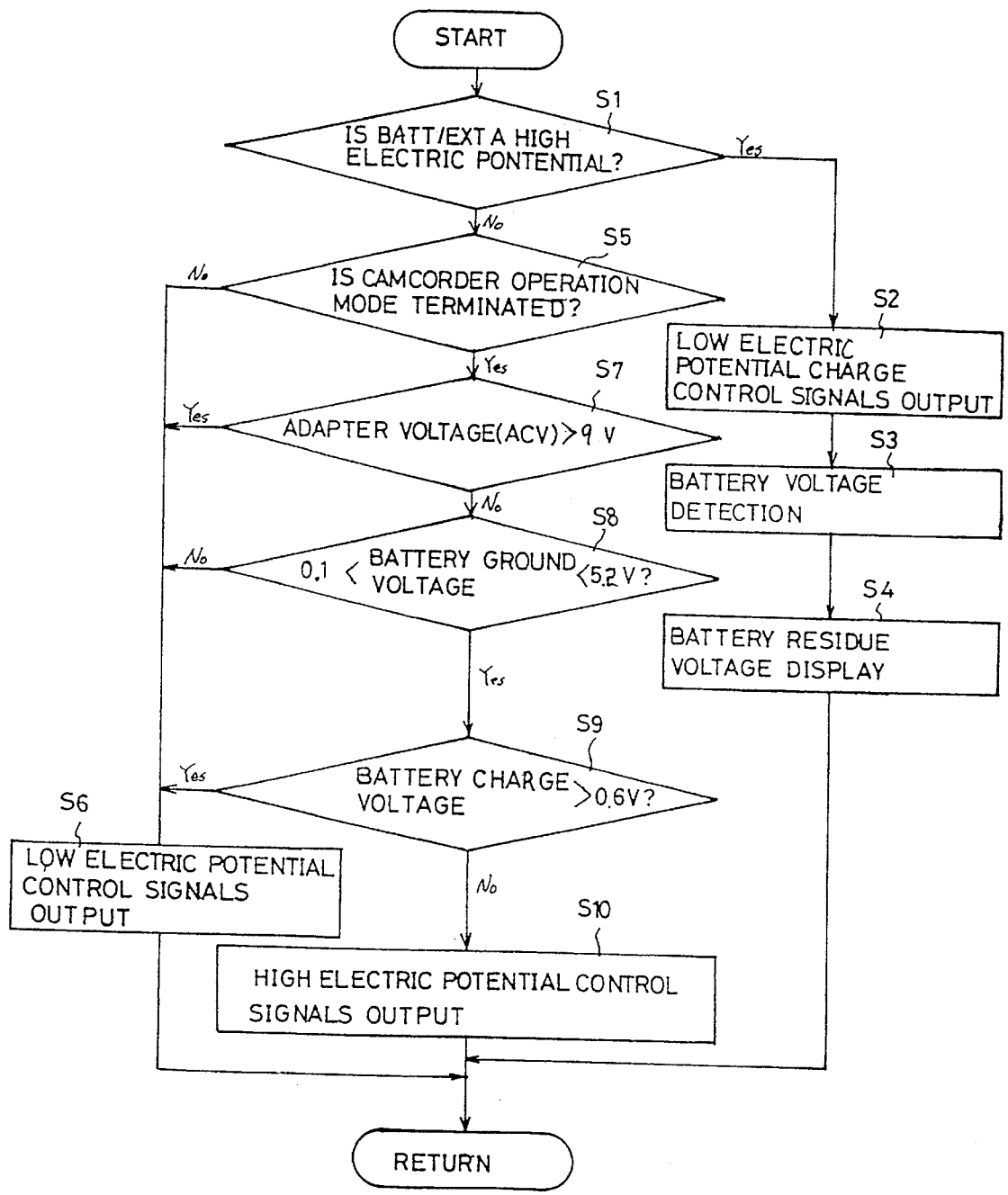
FIG. 3 is a flow chart of signals showing a battery charge control method according to the present invention.

Referring to FIG. 3, the battery charge control operation and effects thereof according to the present invention will now be explained.

To begin with, when the camcorder is separated from the adapter 10, that is, in case of battery mode, the charge electric potential of the battery 13 is inputted into the battery/adapter detection terminal P1 of the central processing unit 17 and into the base of the transistor Q21 of the ground connection control circuit 14 through the resistance R33 of the ground connection control circuit 14.

Here, the transistor Q21 of the ground connection control circuit 14 is turned on due to the high electric potential applied to the base thereof and thereafter the transistor Q22 which receives the low electric potential is turned on. Thereafter, the MOS transistors Q25 and Q26 are turned on due to the high electric potential of the battery 13, which is applied to the gate thereof, so that the ground terminals of the battery 13 and the adapter are grounded.

Therefore, the camcorder is enabled by the power of the battery 13 and then the charge mode of the battery is turned off.

Meanwhile, as the constant-voltage of 5 V of the constant-voltage integrated circuit IC1 of the battery ground voltage output circuit 15 is outputted to the power terminal Vdd of the central processing unit 17, the central processing unit 17 recognizes whether or not the battery/adapter mode signals BATT/EXT is a high electric potential. Here, since the battery/adapter mode signals BATT/EXT of the high electric potential are inputted into the battery/adapter detection terminal P1 of the central processing unit 17, the central processing unit 17 outputs the charge signals of the low electric potential to the base of the transistor Q24 through the charge terminal P2 and thereafter, the transistor Q24 which receives the low electric potential is turned off and then the transistor Q23 which receives the low electric potential is turned on.

Meanwhile, the first voltage output circuit 12 divides the voltages of the battery 13 into the resistances R31 and R32 and outputs a predetermined voltage to the voltage detection terminal P3 of the central processing unit 17. The central processing unit 17 displays the residue voltage of the battery 13 on the LCD(Liquid Crystal Display).

Meanwhile, in case that the adapter 10 is connected to the camcorder, since the battery/adapter mode terminal and the adapter ground terminal AGND are commonly connected to each other, the low electric potential is applied to the battery/adapter detection terminal P1 of the central processing unit 17 and the base of the transistor Q21 of the ground connection control circuit 14, respectively.

Thereafter, the transistor Q21 of the ground connection control circuit 14 is turned off and then the MOS transistors Q25 and Q26 which receives the low electric potential applied to the gate thereof are turned off. As the MOS transistors Q25 and Q26 are turned off, the ground terminals of the battery 13 and the adapter 10 are separated from each other, so that the power of the adapter 10 is inputted into the camcorder.

As the battery/adapter mode signals BATT/EXT of the low electric potential is applied to the battery/adapter detection terminal P1, the central processing unit 17 recognizes the low electric potential of the battery/adapter mode signals BATT/EXT and judges whether or not the operation mode of the camcorder is terminated by the VCR control signals VC and the camera control signals CC which are inputted to the input terminal P6. As a result of the judgement, if the operation mode is not terminated, the central processing unit 17 outputs charge signals of the low electric potential to the base of the transistor Q24 of the battery ground voltage output circuit 15 through the charge terminal P2 and thereafter the transistors Q24 and Q23 are turned off respectively, so that the charge loop does not occur.

As a result of the judgement, if the operation mode of the camcorder is terminated, the first voltage output circuit 12 divides the battery voltage or the adapter voltage into the resistances R31 and R32 and outputs a predetermined voltage to the voltage detection terminal P3 of the central processing unit 17.

Thereafter, the central processing unit 17 which generated the output of the first voltage circuit 12 judges whether or not the voltage ACV of the adapter 10 is over 9 V. If the result is over 9 V, the central processing unit 17 outputs the low electric charge signals to the base of the transistor Q24 of the battery ground voltage output circuit 15 through the charge terminal P2. Thereafter, the transistor Q24 which receives the charge signals of the low electric potential which is applied to the base thereof is turned off. As the transistor Q23 is turned off, the ground terminal of the battery 13 is off, so that the charge operation is terminated.

Here, at the battery 13, the stable charge is secured by the operation of a predetermined current by means of the resistance R36 of the second voltage output circuit 16. When the voltage is over a predetermined voltage, the charge signals of the low electric potential is outputted to the battery ground voltage output circuit 15 and thereafter the transistor Q23 is turned off, so that the over voltage at the battery is stably prevented.

In addition, as a result of the judgement, if the voltage ACV of the adapter is below 9 V, the central processing unit 17 judges whether or not the battery ground voltage is between 0.1 V and 5.2 V.

If the battery ground voltage is over 5.2 V, the central processing unit 17 judges that the battery has been discharged and outputs charge control signals of the low electric potential through the charge terminal P2 and makes the transistors Q24 and Q23 be turned off in order, so that the over current flow is prevented at the resistance R36 of the second voltage output circuit 16 and the difference voltage between the adapter voltage and the battery voltage is charged at the battery 13 through the resistance R40 of 10 kΩ.

Meanwhile, as the charge signals of the high electric potential is outputted through the charge terminal P2 of the central processing unit 17 when the ground voltage of the battery 13 is below 5.2 V, the charge loop of the battery 13 is generated and thereafter the battery charge is secured thereby. If the ground voltage of the battery 13 is below 0.1 V, the charge signals of the low electric potential is outputted through the charge terminal P2 of the central processing unit 17 and thereafter the transistors Q24 and Q23 is turned off in order, so that the charge operation is finished and the difference voltage therebetween is charged by the resistance R40 and thus the voltage of the battery 13 becomes 8.4 V.

If the battery ground voltage is between 0.1 V and 5.2 V, the central processing unit 17 judges whether or not the output voltage Vf of the second voltage output circuit 16 is over 0.6 V for the over current flow at the battery 13. Here, if the voltage Vf is below or equal to 0.6 V, the central processing unit 17 outputs the charge control signals of the high electric potential through the charge terminal P2. If the voltage Vf is over 0.6 V, the central processing unit 17 outputs the charge control signals of the low electric potential and thereafter the transistors Q23 and Q24 of the output circuit 15 are turned off in order, so that the over flow charge at the battery 13 is prevented.

The present invention reduced one fifth of the pans of the hardware, so that the net cost for the product is reduced and the power is conserved thereby. In addition, the malfunction thereof is advantageously prevented, thereby enhancing the product credibility.

What is claimed is:

1. A circuit for controlling charging of a battery, comprising:

adapter connection means for providing a battery/adapter mode signal when an adapter is connected to the adapter connection means;

first voltage output means for outputting first voltages from said battery and said adapter;

ground connection control means for controlling connection of a battery ground terminal and an adapter ground terminal to a ground under control of said battery/adapter mode signal;

battery ground voltage means, which is switched in response to a charge control signal, for outputting output voltages of the battery and the adapter at a first predetermined voltage level and for outputting a battery ground voltage;

second voltage output means for outputting second output voltages at a second predetermined voltage level; and central processing means outputting the charge control signal for controlling charging of the battery in response to the battery/adapter mode signal and the first and second output voltages of the first and second voltage output means.

2. The circuit for controlling charging of a battery of claim 1, wherein said adapter connection means includes a battery/adapter mode terminal which is grounded at said adapter ground terminal when the adapter is connected.

3. The circuit for controlling charging of a battery of claim 1, wherein said first voltage output means divides said first voltages into a plurality of divided voltages and outputs such divided voltages to the central processing means.

4. The circuit for controlling charging of a battery of claim 1, wherein said battery ground voltage means includes a constant-voltage integrated circuit for converting the first voltages to a constant-voltage having said first predetermined voltage level, a first transistor for outputting the constant-voltage from the constant-voltage integrated circuit in response to the charge control signal from the central processing means, and a second transistor, which is switched in response to an output of the first transistor, for outputting battery ground voltage.

5. The circuit for controlling charging of a battery of claim 1, wherein said second voltage output means includes first and second resistances, each connected at one end thereof to an emitter of a transistor, of which another end of the first resistance is connected to the ground terminal of the adapter and of which another end of the second resistance is connected to the other end of the first resistance and to a charge voltage detection terminal of the central processing unit in order to divide voltage outputted from the battery ground voltage output means and to output it.

6. A method for controlling a charge of a battery, comprising:

a first step for outputting a charge control signal of a low electric potential when a battery/adapter mode signal is a high electric potential, detects a residual voltage, and displaying the residual voltage;

a second step for judging whether a camcorder operation mode is terminated when the battery/adapter mode signal is a low electric potential, outputting charge control signals of a low electric potential if the camcorder operatio mode is judged not terminated, and judging whether an adapter voltage is greater than a predetermined level;

a third step for outputting the charge control signals of the low electric potential when the adapter voltage is greater than the predetermined level and judging whether a battery ground voltage is between 0.1 V and 5.2 V;

a fourth step for outputting the charge control signals of the low electric potential when the battery ground voltage is outside the range of 0.1 V and 5.2 V and judging whether a battery charge voltage is greater than a predetermined level when the battery ground voltage is within 0.1 V and 5.2 V; and a fifth step for outputting the charge control signals of the low electric potential when the battery charge voltage is greater than the predetermined level in the fourth step and outputting the charge control signals of the high electric potential and returning to an initial state when the battery charge voltage is less than the predetermined level.

7. A charge control apparatus for controlling charging of a battery, comprising:

adapter connection means for connecting to an adapter;

first voltage circuit means, connected to said battery and to said adapter connection means, for providing a first output voltage and for providing a battery/adapter mode signal;

ground connection control means for controlling, in response to said battery/adapter mode signal, a connection to a ground of a ground terminal of the battery and of a ground terminal of the adapter;

second voltage circuit means for providing a charging voltage and for providing a charge voltage detection signal;

central processing means for providing a charge control signal in response to said battery/adapter mode signal, said charge voltage detection signal, and said first output voltage;

battery ground voltage means for providing said charging voltage to said battery in response to said charge control signal.

* * * * *